(12) United States Patent
Brinkman

(10) Patent No.: US 11,155,215 B1
(45) Date of Patent: Oct. 26, 2021

(54) GOLF CART RACK

(71) Applicant: ICYBREEZE LLC, Sweetwater, TX (US)

(72) Inventor: John Brinkman, Blackwell, TX (US)

( * ) Notice: Subject to any disclaimer, the term of this patent is extended or adjusted under 35 U.S.C. 154(b) by 0 days.

(21) Appl. No.: 16/703,546

(22) Filed: Dec. 4, 2019

Related U.S. Application Data

(60) Provisional application No. 62/775,079, filed on Dec. 4, 2018.

(51) Int. Cl.
*B60R 9/06* (2006.01)
*B60R 9/08* (2006.01)

(52) U.S. Cl.
CPC . *B60R 9/06* (2013.01); *B60R 9/08* (2013.01)

(58) Field of Classification Search
CPC .................................... B60R 9/06; B60R 9/08
USPC ........................................................ 224/274
See application file for complete search history.

(56) References Cited

U.S. PATENT DOCUMENTS

| | | | | |
|---|---|---|---|---|
| 5,052,604 A * | 10/1991 | Tourangeau | ............. | B62J 11/00 224/274 |
| 5,429,290 A * | 7/1995 | Greene, Jr. | ............... | B60R 9/00 224/274 |
| D369,340 S * | 4/1996 | Lichtbach | ..................... | D12/408 |
| 5,727,642 A * | 3/1998 | Abbott | ............... | A63B 71/0009 180/6.5 |
| 5,806,738 A * | 9/1998 | D'Angelo | ................. | B60R 9/08 224/274 |
| 6,039,227 A * | 3/2000 | Stark | ......................... | B60R 9/06 206/315.3 |
| 6,183,029 B1 * | 2/2001 | Deaton | .................. | B62D 63/02 296/37.1 |
| 6,422,641 B1 * | 7/2002 | Coryell | .............. | B62D 33/0621 224/274 |
| D463,999 S * | 10/2002 | Beck | ............................. | D12/16 |
| 6,554,171 B1 * | 4/2003 | Ewing, III | ................ | B60R 9/06 211/85.7 |
| 6,641,192 B2 * | 11/2003 | Eschenfelder | ......... | A47B 87/02 296/37.1 |
| D586,287 S * | 2/2009 | McBride | ...................... | D12/106 |
| 8,167,351 B2 * | 5/2012 | Plowman | ............... | B60N 2/305 296/69 |
| 8,662,363 B2 * | 3/2014 | Williams | ............... | A63B 57/00 224/274 |
| D841,564 S * | 2/2019 | Sartin | ......................... | D12/406 |
| 10,343,615 B2 * | 7/2019 | Bonenberger | ......... | B62D 21/14 |
| D894,091 S * | 8/2020 | Morris | ......................... | D12/412 |
| 2005/0000987 A1 * | 1/2005 | Heidenreich | .......... | A63B 55/40 224/274 |

(Continued)

*Primary Examiner* — Justin M Larson
(74) *Attorney, Agent, or Firm* — Jackson Walker LLP

(57) ABSTRACT

The improved rack of the present invention has a basket for holding a cargo that is anticipated to be an ice chest or ice cooler, but is not limited to those items. The rack is shaped to be complimentary and attached to a bag bar of a golf cart or other cart. It is anticipated that the basket front can be shaped to fit against a number of different shapes of bag bars found in multiple styles, brands, makes, models, and years of cart. It can be attached by a strap and clamp in some embodiment, and by fasteners on others. The rack also has a bag support is attached to the rear of the basket for attaching golf bags to when the rack is installed in a cart. A bag platform is positioned below the bag support for the golf bags to rest on.

13 Claims, 5 Drawing Sheets

(56) References Cited

U.S. PATENT DOCUMENTS

2007/0023466 A1* 2/2007 Policastro ................. B60R 9/00
                                                    224/42.39
2007/0057526 A1* 3/2007 Bigelow .............. B60N 2/3095
                                                    296/65.03

* cited by examiner

GOLF CART RACK

This application is based upon and claims priority from U.S. Provisional application Ser. No. 62/775,079, which is incorporated herein by reference.

BACKGROUND OF THE INVENTION

Field of the Invention

Applicants' invention relates to a device for carrying golf club bags as well as ice chests, portable air conditioning units, as well as other cargo.

Background Information

Golf carts have provided convenience on golf courses since their introduction, but the popularity of golf carts as a means of transportation and for other uses has exploded. The recent rise of neighborhood golf carts may have started when new homes began being built with a $3^{rd}$ space or a half-garage spot ideal for a cart. Golf carts make it much easier, efficient, and more pleasant when making short trips within a neighborhood. Likewise, golf carts are becoming more used and useful for work and other types of recreation. Even all terrain travel has become an option. Being able to tackle new terrain is popular with many people such as campers and hunters.

Another popular product with golfers, hunters, recreational enthusiasts, and the like is the ICYBREEZE® portable air conditioning unit, which combines an ice chest for holding food and drinks with a built-in heat exchanger that uses the water and ice of the ice chest with a heat exchanger to cool ambient air and blow the chilled air out of the chest.

Although very different in function, golf carts and portable air conditioning units are popular with generally the same types of users, and for generally the same types of activities.

SUMMARY OF THE INVENTION

The present invention allows users to mount a portable air conditioning unit, ice chest, or other equipment ("cargo") on the bed of a golf cart without interrupting the golf cart's main function of carrying golf bags and other equipment ("equipment") while the golf cart transports its occupants from hole to hole or place to place.

In order to solve the difficulties presented in attempting to obtain these features, a unique rack apparatus has been developed which allows for carrying cargo on a golf cart while maintaining the golf cart's ability to still carry equipment.

DETAILED DESCRIPTION OF THE PREFERRED EMBODIMENT

Figure 1:
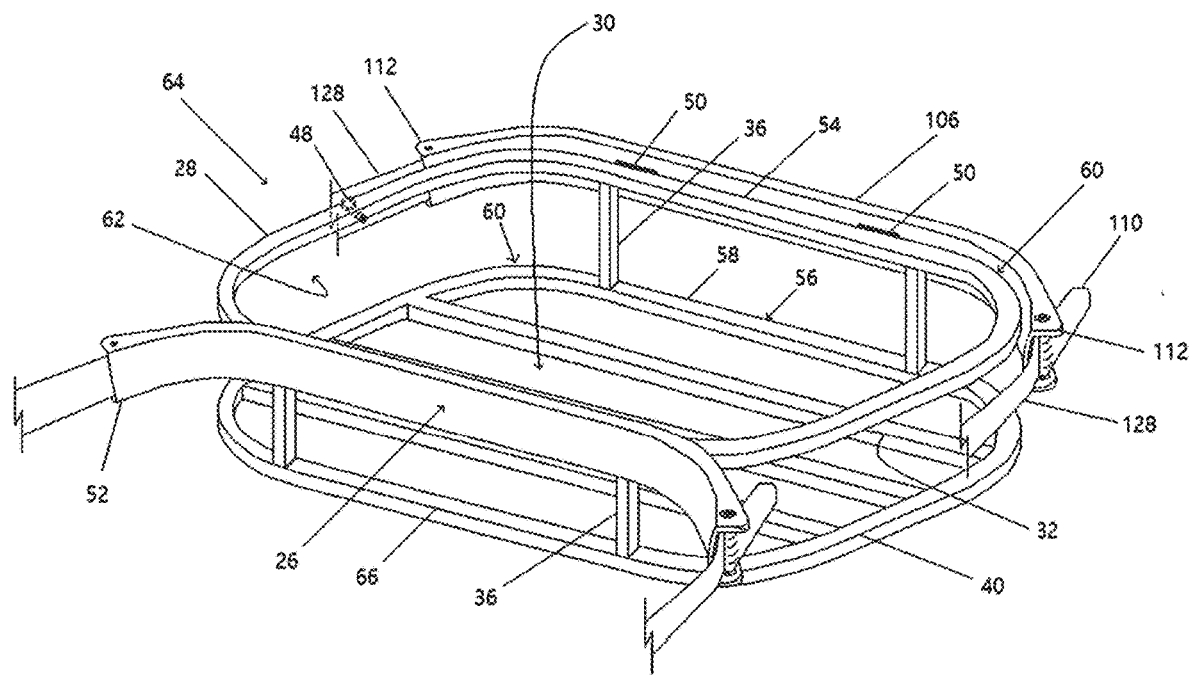
FIG. 1. is a perspective view of the rack.

| REF. | ELEMENT |
|---|---|
| 10 | Rack |
| 12 | Bottom Brace |
| 14 | Front Upright |
| 16 | Receiver Tube |
| 18 | Insert Tube |
| 20 | Bag Platform |
| 22 | Hitch Pin |
| 24 | Rear Upright |
| 26 | Bag Support |
| 28 | Rail |
| 30 | Platform |
| 32 | Cross Bar |
| 34 | Cross Piece |
| 36 | Lifter |
| 38 | Buckle |
| 40 | Edge Member |
| 42 | Basket |
| 44 | Connector |
| 46 | Belt |
| 48 | Coupling |
| 50 | Fastener |
| 52 | Support End |
| 54 | Rail Front |
| 56 | Platform Front |
| 58 | Edge Member Front |
| 60 | Engagement Curvature |
| 62 | Side |
| 64 | Basket |
| 66 | Rail Back |
| 68 | Platform Back |
| 100 | Cart |
| 102 | Bed |
| 104 | Pillar |
| 106 | Bag Bar |
| 108 | Bag Support Brace |
| 110 | Clasp |
| 112 | Bar End |
| 114 | Cargo |
| 116 | Chassis |
| 118 | Wheel |
| 120 | Seat |
| 122 | Post |
| 124 | Golf bag |
| 126 | Roof |
| 128 | Strap |

Unless otherwise specifically noted, articles depicted in the drawings are not necessarily drawn to scale, however the drawings do indicate relative size and placement.

Throughout this disclosure, a hyphenated form of a reference numeral refers to a specific instance of an element and the un-hyphenated form of the reference numeral refers to the element generically or collectively. Thus for example, widget 12-1 would refer to a specific widget of a widget class 12, while the class of widgets may be referred to collectively as widgets 12 and any one of which may be referred to generically as a widget 12.

Referring to the figures, FIG. 1 illustrates the basket portion, bag bar, and bag support portions of the rack 10. The rack 10 is comprised of a basket 64 and various braces that allow it to be installed in the bed 102 of a cart 100. The basket 64 is comprised sides 62 that are attached around the perimeter of a platform 30, and a rail 28 attached to the sides 62 opposite from the platform 30. The basket 64 has an open interior, defined by the platform 30, sides 62, and rail 28, that is shaped and sized to accept a cargo 114 such as an ice chest.

The platform 30 is anticipated to have various embodiments. One such embodiment is illustrated FIG. 1, in which the platform 30 is comprised of a circumferential edge member 40 with cross bars 32. The cross bars may be varying in number and in orientation. Other embodiments could include a solid platform 30, a platform 30 with holes such as expanded steel, or any platform 30 that is capable of supporting the cargo 114, such platforms 30 being known in the art.

Likewise, the sides 62 may be made in a number of embodiments. One embodiment is shown in the figures where one or more lifters 36 are attached at a first end to the platform's 30 circumferential edge member 40. At the second end of the lifters 36, a rail 28 is attached, raised from the platform 30.

The nature of golf carts 100 is that they are designed to hold and carry golf bags in their beds 102. Generally, the carts 100 employ a bag bar 106, against which the golf bag 124 is strapped, with the bags resting on the bed 102. The front of the basket 64 is shaped and sized to be urged and fit against, and secured to, the bag bar 106. In the illustrated embodiment a typical bag bar 106 is shown having a generally straight middle section with curved ends. The curved ends of the bag bar 106 allow a better nestling of the golf bag 124 against the bag bar 106. In order to better urge the rack 10 against the bag bar 106, the rail front 54 and platform front 56 may be shaped with an engagement curvature 60 that is complimentary to the curve or shape of the bag bar 106.

The golf bag 124 is usually held in place by a strap 128 that can be inserted into, and held tight, by a clasp 110. It is anticipated that the rack 10 may be held against the bag bar 106 by a number of possible fasteners 50, such as one or more of a weld, adhesive, rivet, screw, bolt, hook, hook and loop, clamp, snap, or magnet. It is also anticipated that alternatively, the rack 10 could be secured to the bag bar 106 using a strap 128 attached to the basket 64 by a coupling 48 and the opposite end of the strap 128 inserted into, and held tight, by clasp 110.

In order be able to install the rack 10 and still be able to carry a golf bag 124, a bag support 26 is attached to the basket back 66 (which might include either or both of the rail back and the platform back). In form and function the bag support 26 is similar to the bag bar 106, it is shaped and sized to better allow a golf bag 124 to be urged against it. A golf bag 124 is secured to the bag support 26. In the illustrated embodiment a typical bag support 26 is shown having a generally straight middle section with opposing, curved ends 52. The curved ends 52 of the bag support 26 allow a better nestling of the golf bag 124 against the bag support 26. At each end of the bag support 26 a buckle 38 may be attached, the buckle 38 allowing for attachment and tensioning of a strap The golf bag 124, while engaged with the bag support 26, rests either on on a bag platform 20 or the bed 102.

Figure 2:
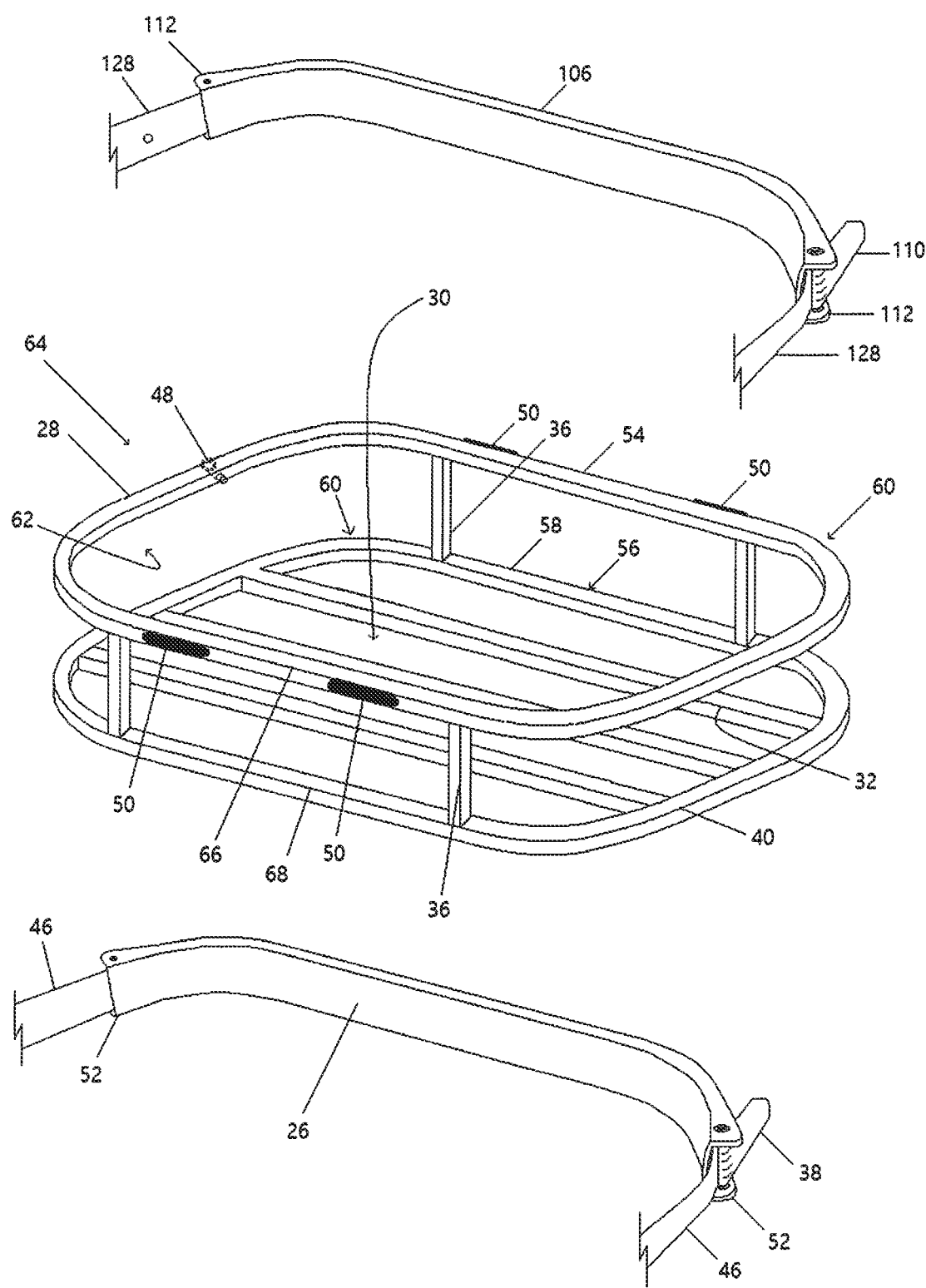
FIG. 2. is an exploded, perspective view of the rack.

FIG. 2 shows an exploded view of the basket portion, bag bar, and bag support portions of the rack 10. This figure shows more clearly the basket back, which is made up of the rail back 66 and the platform back, as well as the fasteners 50 used to connect the bag support 26 to the basket 64.

Figure 3:
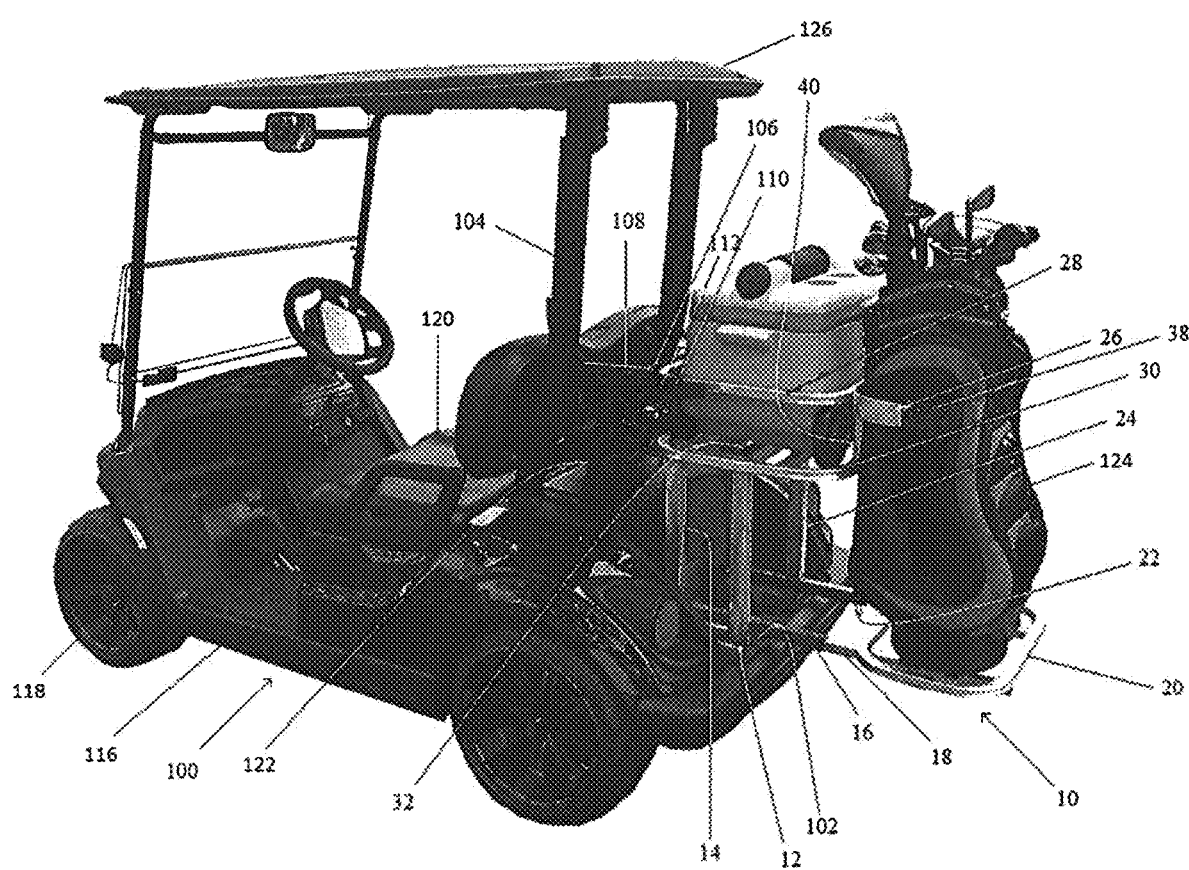
FIG. 3. is a first perspective view of a golf cart with the rack installed.

FIG. 3 illustrates a first embodiment of the rack 10. A basic golf cart 100 has a chassis 116 with three or four wheels 118, a seat 120 and a roof 126 held up by pillars 104. A bed 102 behind the seat 120. In order to carry golf bags 124, a post 122 is connected to the cart 100. Opposite the connection to the cart 100, the post 122 is connected to a bag support brace 108. Opposite the post 122 connection, the bag support brace is connected to a bag bar 106. The bag bar 106 is sized and curved to accept one (1) or two (2) golf bags 124 that can be urged against the bag bar 106. Clasps 110 may be attached to the ends 112 of the bag bar 106 and a strap 128 is attached to the basket using a coupling 48 and connectable or engageable with a clasp 110 at the end 112 of the bag bar 106. Or, the strap 128 is engaged to a first clasp 110-1 at one end 112-1 extended around the golf bag 124 to hold it urged against the bag bar 106, and connectable or engageable to a second clasp 110-2 at the other end 112-2 of the bag bar 106.

The bottom of the golf bag 124 rests on the bed 102 or on.

The rack 10 is added to the cart 100 by attaching bottom braces 12 to the bed 102. The bottom braces 12 provide support for the remainder of the rack 10 structure. Front uprights 14 extend upwardly from the front ends of the bottom braces 12. Rear uprights 24 extend upwardly from the rear ends of the bottom braces 12. The front upright 14 and rear upright 24 extend upwardly from the cart bed or conversely downwardly from the basket 42 so as to raise or position said basket 42 up to generally level with said bag bar 106. The front upright 14 and rear upright 24 are attached to the cart, or cart bed, opposite the basket 42. At the tops of the front uprights 14 and rear uprights 24 a platform 30 is attached. The platform 30 is generally rectangular and may have rounded corners. The platform 30 may be solid or have cross bars 32. A rail 28 matches the size and shape of the circumference of the platform 30. The platform 30 and the rail 28 are attached at opposing ends of lifters 36.

The rack 10 attaches to the cart 100, at least in part, by the rail 28, platform 30, or upper portion of the rack 10. The rack 10 sits in the bed 102 of the golf cart 100. The bottom of the rack 10, such as the bottom brace 12, can be attached to the bed 102 by connectors (such as bolts, screws, rivets or pins), clamps, adhesives, or welds as a user determines. The rack 10 may also sit freely in the bed 102 of the cart 100, held in place by gravity and friction. The upper part of the rack 10 is the basket 42 generally made up of the rail 28, the platform 30, a multiplicity of cross bars 32, and a multiplicity of lifters 36.

The rack 10 is attached to the cart 100, and is generally anticipated to be attached in either of two ways. The front portion of the basket 42 sits against the cart's 100 existing bag bar 106 and is shaped with curved ends in order to be urged against the bag bar 106. Straps 128 are located generally at an end or near the center of the bag bar 106. The strap 128 and a corresponding clamp 10 are generally used to hold golf bags 124 on the cart 100. In an embodiment of the present invention, the straps 128 and clasps 110 generally attached to the bag bar 106 and used to hold golf bags 124 urged against the bag bar 106 can be used to secure the basket 42 to the bag bar 106 using corresponding belts 46 and buckles 38 that are attached to the basket 42. The belts 46 can either be attached to the basket 42 and slide into the existing clasps 110 on the cart 100 (usually on the bag bar 106) or the belts 46 can be attached to the basket 42 and slide into the existing clasps 110 on the cart 100. These clasps 110 are the existing clasps 110 on the cart 100 that hold the golf bags 124. By securing the straps 128 at either side of the bag bar 106 and basket 42, the rack 10 is held and stabilized on the cart 100.

Alternatively, the basket 42 can be attached to the bag bar 106 by using connectors (such as bolts, screws, rivets or pins), clamps, adhesives, or welds.

The rail 30 circumscribes an opening that a cargo 114, such as an ice chest or portable air conditioning unit, into which the cargo 114 may be placed. The rail 30 acts as a guard keeping the cargo 114 from sliding off of the platform 30 when the cart 100 turns and moves.

Attached to either the rail 28 or the platform 30 opposite the bag bar 106 is a bag support 26. The bag support 26, similar to the bag bar 106 is sized and curved to accept one (1) or two (2) golf bags 124 that can be urged against the bag support 26. Buckles 38 are attached to the ends of the bag support 26. A strap (not shown) is attached to a first buckle 38-1 and extended around the golf bag 124 to hold it urged against the bag support 26, and further extends, and is connected, to a second buckle 38-2. It is anticipated that the buckles 38 have an open position that allows the strap (not shown) to slide through the buckle 38, and a closed position that stops the strap (not shown) from sliding, thus allowing for adjustment to the strap (not shown) to fit as desired against the golf bag 124.

Attached near the bed 102 either, both, or all of the bottom brace 12, the front upright 14, and the rear upright 24 is a multiplicity of receiver tubes 16. The receiver tubes 16 extend outwardly from the back of the bed 102. At the ends of the receiver tubes 16 opposite the cart 100, the receiver tubes 16 are attached to a complementary number of insert tubes 18. It is anticipated that the receiver tubes 16 and the insert tube 18 could be one unit, or a pair of units designed to connect. For example, it is anticipated that the receiver tubes 16 could be hollow and sized such that the inner dimensions of the receiver tubes 16 are slightly larger than the outer dimensions of the insert tube 18 allowing the insert tube 18 to slide into the receiver tube 16. The insert tubes 18 extend further from the back of the bed 102. A bag platform 20 is attached to the insert tubes 18. When a golf bag 124, or other equipment, is strapped against the bag support 26, the golf bag 124 can rest on the bag platform 20. The bag platform 20 is attached to one or more of the front upright 14, the rear upright 24, the bed 102, or the cart 100, in a position such that the bag platform 20 is parallel with the basket platform 30, lower than the platform 30, and below the bag support 26 such that the golf bag 124, when positioned against the bag support 26 can rest on the bag platform 20.

Figure 4:
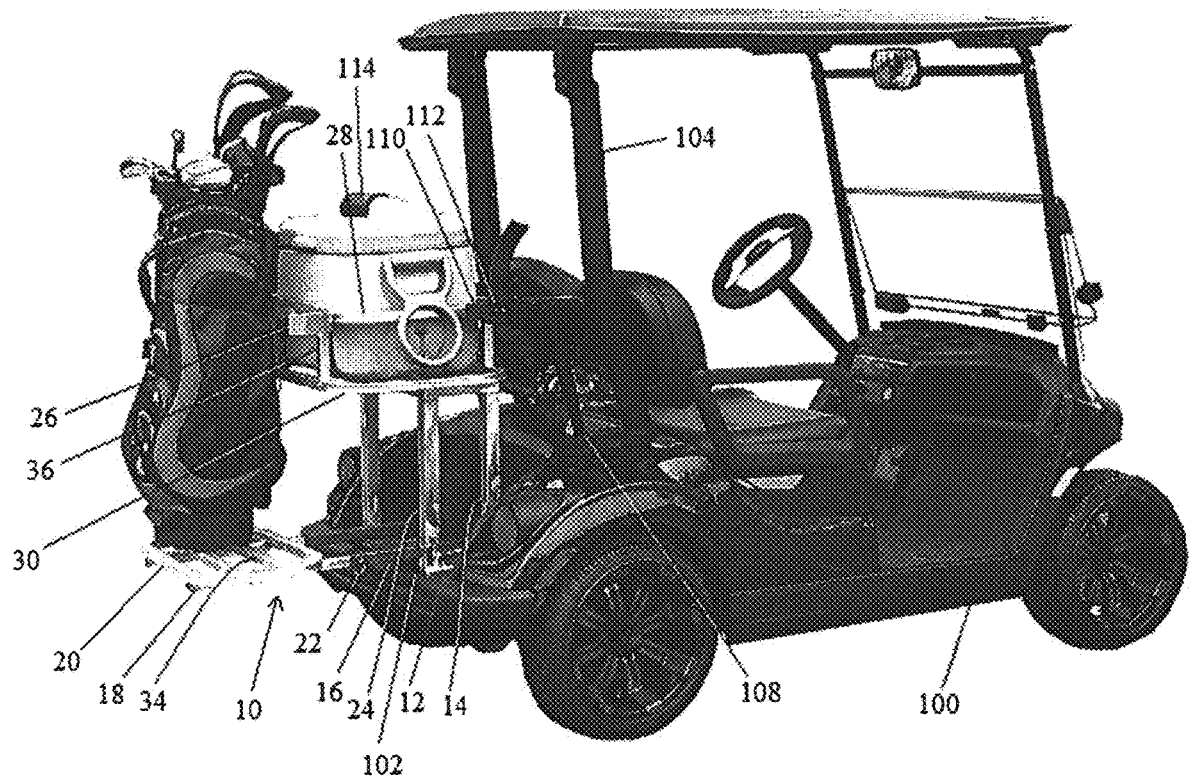
FIG. 4. is a second perspective view of a golf cart with the rack installed.

FIG. 4 illustrates an embodiment of the cart 100 and rack 10 from a different angle than that of FIG. 3. The platform 30 is shown holding a cargo 114. Rail 28 circumscribes the cargo 114 and allows the cargo 114 to be inserted into it and down onto the platform 30. The rail 28 is held upwardly from the platform 30 by the lifters 36 which are attached to the platform 30 and rail 28 at opposite ends. This figure also more clearly shows the curvature of the bag support 26 which allows a golf bag 124 to be placed against it and help hold the golf bag 124 while the cart 100 is moving.

This figure also shows one embodiment in which the insert tubes 18 are sized to fit in the receiver tubes 16. The insert tubes 16 slide inside the hollow receiver tubes 16 and are held in place by a connector such as a hitch pin 22.

The bag platform 20 may be solid or have cross pieces 34 that provide a platform upon which the golf bag 124 may rest.

The rack 10 provides three or more spaces in which equipment may be stored contrasting to the one space on the bed 102 of the cart 100. However, although the rack 10 is added to the cart 100 and bed 102, the primary purpose of carrying cargo 114, particularly golf bags 124, is maintained by the rack 10.

Figure 5:
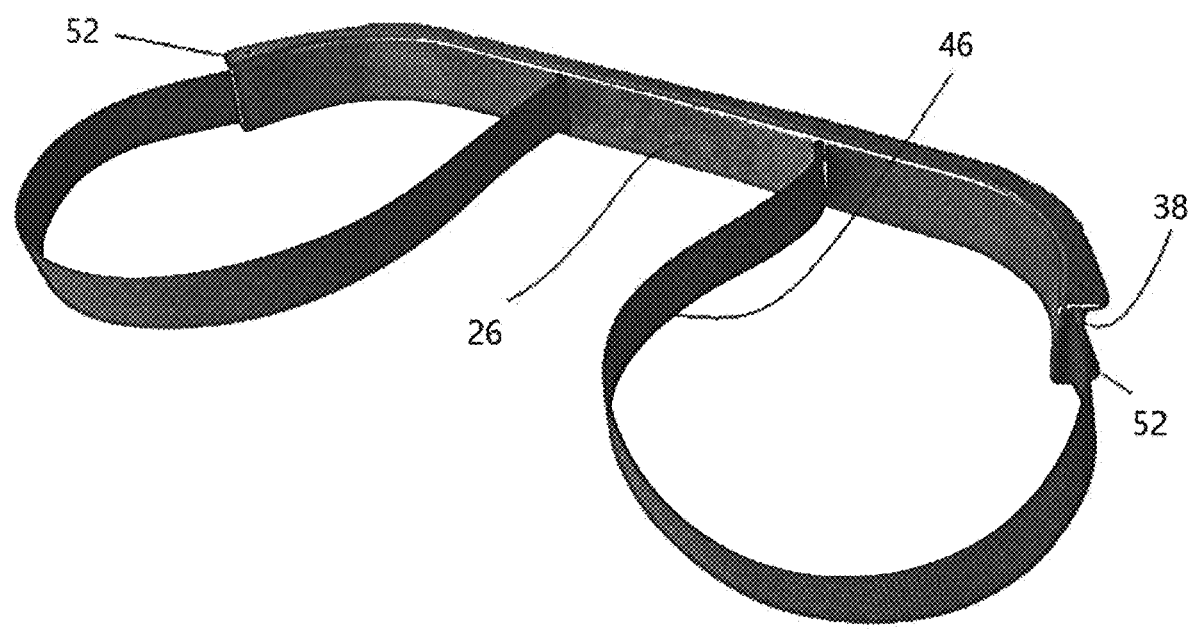
FIG. 5, illustrates the bag support of the rack.

FIG. 5 shows more clearly the bag support 26 and belts 46. It also illustrates an embodiment in which the belts 46 are attached to the bag support 26.

It should be noted that when "about" or "approximately" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities and the like used in the present specification and associated claims are to be understood as being modified in all instances by the terms "about" or "approximately." As used herein, the terms "about" or "approximately" encompasses +/−5% of each numerical value. For example, if the numerical value is "about 80%," then it can be 80%+/−5%, equivalent to 75% to 85%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

The terms "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or any variation of these terms refer to any measurable decrease, or complete inhibition, of a desired result. The terms "promote" or "increase" or any variation of these terms includes any measurable increase, or completion, of a desired result.

The term "effective," as that term is used in the specification and/or claims, means adequate to accomplish a desired, expected, or intended result.

The terms "a" or "an" when used in conjunction with the term "comprising" in the claims and/or the specification may mean "one," but it is also consistent with the meaning of "one or more," "at least one," and "one or more than one."

The term "each" refers to each member of a set, or each member of a subset of a set.

The terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

In interpreting the claims appended hereto, it is not intended that any of the appended claims or claim elements invoke 35 U.S.C. 112(f) unless the words "means for" or "step for" are explicitly used in the particular claim.

It should be understood that, although exemplary embodiments are illustrated in the figures and description, the principles of the present disclosure may be implemented using any number of techniques, whether currently known or not. The present disclosure should in no way be limited to the exemplary implementations and techniques illustrated in the drawings and description herein. Thus, although the invention has been described with reference to specific embodiments, this description is not meant to be construed in a limited sense. Various embodiments may include some, none, or all of the enumerated advantages. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention. Modifications, additions, or omissions may be made to the systems, apparatuses, and methods described herein without departing from the scope of the disclosure. For example, the operations of the systems and apparatuses disclosed herein may be performed by more, fewer, or other components in the methods described may include more, fewer, or other steps. Additionally, steps may be performed in any suitable order.

I claim:

1. A rack for carrying cargo attachable to a golf cart having a bag bar and said bag bar having opposing curved ends with an attached clasp, said rack comprising:
   a basket, said basket having an open interior, defined by a platform, a side, and a rail, wherein said basket is shaped and sized to accept said cargo;
   a basket front of said basket having an engagement curvature that is complimentary to a shape of said bag bar;
   a strap attached to said basket, said strap engagable with said clasp;
   a bag support, wherein said bag support is attached to a basket back of said basket, and wherein said bag support has a generally straight middle section and a curved end; and
   a buckle attached to said curved end.

2. The apparatus of claim 1, further comprising:
   a front upright attached to said platform opposite said side, said front upright extending downwardly so as to raise said basket up to generally level with said bag bar; and
   a rear upright attached to said platform opposite said side, said rear upright extending downwardly so as to raise said basket up to generally level with said bag bar.

3. The apparatus of claim 1, further comprising:
   a bag platform, wherein said bag platform is attached in a position such that said bag platform is parallel with said platform, lower than said platform, and below said bag support such that the golf bag, when positioned against said bag support can rest on said bag platform.

4. The apparatus of claim 2, further comprising:
   a bag platform, wherein said bag platform is attached to one or more of said front upright, said rear upright, or said cart, in a position such that said bag platform is parallel with said platform, lower than said platform, and below said bag support such that the golf bag, when positioned against said bag support can rest on said bag platform.

5. The apparatus of claim 4, wherein said rack is attached to said cart.

6. The apparatus of claim 1, wherein said cargo is an ice chest or ice cooler.

7. A rack for carrying cargo attachable to a golf cart having a bag bar and said bag bar having opposing curved ends with an attached clasp, said rack comprising:
   a basket, said basket having an open interior, defined by a platform, a side, and a rail, wherein said basket is shaped and sized to accept said cargo;
   a basket front of said basket having an engagement curvature that is complimentary to a shape of said bag bar;
   said basket attachable to said bag bar by a fastener,
   a bag support, wherein said bag support is attached to a basket back of said basket, and
      wherein said bag support has a generally straight middle section and a curved end; and
   a buckle attached to said curved end.

8. The apparatus of claim 7, further comprising:
   a front upright attached to said platform opposite said side, said front upright extending downwardly so as to raise said basket up to generally level with said bag bar; and
   a rear upright attached to said platform opposite said side, said rear upright extending downwardly so as to raise said basket up to generally level with said bag bar.

9. The apparatus of claim 7, further comprising:
   a bag platform, wherein said bag platform is attached in a position such that said bag platform is parallel with said platform, lower than said platform, and below said bag support such that the golf bag, when positioned against said bag support can rest on said bag platform.

10. The apparatus of claim 8, further comprising:
    a bag platform, wherein said bag platform is attached to one or more of said front upright, said rear upright, or said cart, in a position such that said bag platform is parallel with said platform, lower than said platform, and below said bag support such that the golf bag, when positioned against said bag support can rest on said bag platform.

11. The apparatus of claim 10, wherein said rack is attached to said cart.

12. The apparatus of claim 7, wherein said cargo is an ice chest or ice cooler.

13. A rack for carrying cargo attachable to a golf cart having a bag bar and said bag bar having opposing curved ends with an attached clasp, said rack comprising:
    a basket, said basket having an open interior, defined by a platform, a side, and a rail, wherein said basket is shaped and sized to accept said cargo;
    a basket front of said basket having an engagement curvature that is complimentary to a shape of said bag bar;
    said basket attachable to said bag bar by a fastener,
    a bag support, wherein said bag support is attached to a basket back of said basket, and wherein said bag support has a generally straight middle section and a curved end;
    a buckle attached to said curved end;
    a front upright attached to said basket opposite said side, said front upright extending downwardly so as to raise said basket up to generally level with said bag bar, said front upright attached to said cart opposite said basket;
    a rear upright attached to said platform opposite said side, said rear upright extending downwardly so as to raise said basket up to generally level with said bag bar, said rear upright attached to said cart opposite said basket; and
    a bag platform, wherein said bag platform is attached to one or more of said front upright, said rear upright, or said cart, in a position such that said bag platform is parallel with said platform, lower than said platform, and below said bag support such that the golf bag, when positioned against said bag support can rest on said bag platform.

* * * * *